Nov. 30, 1954  M. C. PHARO  2,695,707
ASBESTOS FIBER RECOVERY
Filed April 20, 1949  4 Sheets-Sheet 1

Inventor
Merritt C. Pharo
By Alan Smaberg
Attorney

Nov. 30, 1954 M. C. PHARO 2,695,707
ASBESTOS FIBER RECOVERY
Filed April 20, 1949 4 Sheets-Sheet 3

Inventor
Merritt C. Pharo
By Alda Ainsley
Attorney

Nov. 30, 1954    M. C. PHARO    2,695,707
ASBESTOS FIBER RECOVERY
Filed April 20, 1949    4 Sheets-Sheet 4

Inventor
Merritt C. Pharo
By Ada Smalley
Attorney

2,695,707

ASBESTOS FIBER RECOVERY

Merritt C. Pharo, Thetford Mines, Quebec, Canada, assignor to Johnson's Company Ltd., Thetford Mines, Quebec, Canada, a corporation of Quebec Application April 20, 1949, Serial No. 88,518

Claims priority, application Canada February 22, 1949

1 Claim. (Cl. 209—2)

Introduction

This invention relates to the recovery of asbestos from asbestos-containing ores.

The novelty of the invention will be best understood by contrasting it with asbestos fiber recovery as practiced commercially today.

In commercial practice today, the ore is obtained by quarrying in the open cast system or by underground mining. The highest grade of the mineral, known as "crude" asbestos is removed from the ore by hand. "Crude" forms only a small proportion of the yield of a Canadian chrysotile asbestos mine. The remainder is "milled" fiber, which must be recovered by mechanical means. In the recovery of milled fiber, the ore is first dried. Then it is crushed. This involves several reducing operations by which the rock is finally reduced to approximately 2½ inches. It must also be dried to remove inherent moisture.

Milling includes further crushing, in a series of steps in which the rock is finally reduced to about ½ inch. Following each of these steps, free fiber is removed to prevent injury in subsequent operations. The milled fiber is then graded and bagged for shipment.

Those in the industry have recognized for a long time that the dry method involves certain disadvantages. A large mass of ore, of which the greater part has to be discarded must be dried at a great loss of energy. A certain amount of fiber is lost, both through breakage of the fiber and otherwise. Consequently, there have been suggestions for recovering asbestos from ore by wet methods, but these have been on highly theoretical grounds and have been laboratory experiments which have not lent themselves to plant scale operations. So, the mills still employ a dry recovery process more or less as described above.

Moreover, asbestos ore, because of its physical nature and other characteristics, does not normally lend itself to being handled in apparatus employed for dressing ores of other minerals. In the case of non-fibrous minerals (representing nearly all known minerals), separation can be effected merely by crushing to a particular fineness at which a particular type of classifying or separating apparatus is operative. Then, the difference in the specific gravity of the mineral particles and that of the rock affords a "classification differential" which makes itself evident in causing a settling action with the mineral gravitating from the gangue.

With asbestos, the problem is not the same. The ore may be crushed to a certain size which would, in the case of another mineral, make possible its hydraulic classification in particular types of apparatus. But, when asbestos is subjected to a similar treatment, the specific gravity and other characteristics of the rock and veinlets of asbestos is such that no classification differential exists. So, when asbestos ores are subjected in the ordinary way to the action of hydraulic classification apparatus, no substantial separation takes place. There are also other dressing problems peculiar to asbestos.

The applicant's development

The applicant has invented a process which solves the problem of hydraulic recovery of asbestos fiber from ore masses and residues containing it. The process is based at least in part on the finding that when the masses are in a state we shall define as having a "classification differential" (referred to herein as a "C. D.") they can be separated with success by certain hydraulic classification methods. A principal phase of the invention is in applying this finding to treating asbestos masses by hydraulic shaken bed classification, more specifically, tabling. C. D. depends on a combination of several factors which do not obtain in a normal mass of asbestos. By "normal" we mean a state that comes about by the methods that prevail today for recovering the fiber.

One factor is size. For example, the applicant has found that tabling is only practical on a commercial scale with an asbestos-containing mass which screens predominantly between 6 and 16 mesh (through 6 on 16). Preferably about 70 to about 95% by dry weight (it is understood that all percentage comparisons given in the application are by dry weight except where otherwise mentioned) should be within this range of size. They should preferably contain a certain minimum of free fiber (i. e. severed from and non-adherent to the rock). The amount of fiber in the mass usually ranges from about 2.5 to about 80% but the table will extract smaller amounts. Another factor is the condition of the fiber content. For a C. D. to exist, much of the fiber must be fluffed. Proper classification will not take place unless at least about 40% and preferably from about 70 to about 95% or more of the fiber is fluffed. Good results come from treating the mass in the form of an aqueous slurry containing from about 1 to about 15% solids. Water is also added to the table to cause the fiber to flow away from the gangue which deposits on the floor of the table as it is shaken.

The applicant has found that mill tailings, weathered dump tailings and pit ore can be treated with success by a proper combination of hydraulic steps, preferably culminating in final separation by tabling. The exact nature of the masses tabled will depend on the starting material available. So, another phase of the invention is in the selection and pre-treatment of this material to alter its normal state so that it will have a C. D. making it susceptible to tabling.

The invention contemplates, as early steps prior to tabling, sizing, or severance and sizing combined with or followed by hydraulic classification. Milling to fluff the fiber may also be needed.

Hydraulic hindered settling classification has been found to be good for classifying either mill or dump tailings after early sizing. This treatment has also been found good for classifying pit ore after crushing, sizing, and in some cases milling, to fluff enough of the fiber for the mass to have a C. D. The exact steps which have to be used on the different types of starting material will vary, as will be clear from the detailed description which follows.

For good results the applicant has found that the material going to the hydraulic hindered settling classifier should be substantially all through 4 mesh, preferably about all through 6 mesh, should contain at least about 40 to about 75% of the fiber in the fluffed state and the mass should contain from about 1 to about 30% fiber, at least, based on the total weight of the mass. After suitable pre-treatment and hydraulic hindered settling classification, a fraction is produced which lends itself to shaken bed classification.

Tailings can be brought into condition for classifying by screening. Pit ore has first to be crushed, then screened, and preferably milled, so as to reduce the lumps to a size which can be handled in the classifier, and to sever sufficient of the fiber from the rock and to fluff it. This results in the needed C. D. Prior to tabling, the residue usually constitutes about 15 to about 35% of the mass resulting from the pre-treatment.

As an alternative to screening and hydraulic hindered settling classification the applicant contemplates the use of hydraulic rake classification. By this method the starting asbestos mass after primary crushing, and, if necessary milling, to give lumps of a size which can be handled conveniently and a mass which contains enough fluffed asbestos to give it a C. D., can be treated by rake classification to remove from about 75 to about 92% gangue by dry weight and to provide a residue representing from about 8 to about 25% of the starting mass which can be handled well on a shaking table. It is also contemplated that other ways of hydraulic classification may be employed, within the broad purview of the invention, to pre-condition the asbestos mass prior to tabling.

After shaken bed classification, the fiber recovered may be thickened and, caked, shredded, dried, and fluffed. Sometimes the dried product may need further screening to take out a small fine sand residue. After grading, the fiber may then be bagged and shipped.

As described, there may be recovered asbestos fiber substantially free from gangue, fluffed fiber separately from harsh fiber, and useful fractions of the gangue, for example, magnetite and also sized washed aggregate.

Treatment of pit ore

In the treatment of ore from the pit of an asbestos mine, the applicant has found that it is preferable first to size the material, for example by screening, into that containing essentially the long free fiber and that containing essentially the short free fiber, and to separate these fractions from the oversize lumps of ore containing fiber unsevered from the rock. Following this concept, the fraction containing the long fiber and the fraction containing the short fiber are processed separately in hydraulic classification steps and the fraction containing the oversize lumps of ore is subjected to further reduction to sever the fiber from the rock and further to reduce the size of the rock and fluff the veins of fiber.

By this pre-treatment both the long and short fiber fractions are in a condition where they may be handled, at least in a preliminary manner, by hydraulic classification apparatus. There is sufficient free fluffed fiber present in each instance to give the fraction a hydraulic C. D. enabling the free fiber and rock to be preliminarily classified with the recovery of a high proportion of free fiber. But, in this preliminary classification, the residue from which the free fiber has been removed has been found still to contain large amounts of components which have no hydraulic C. D. The applicant has discovered that such a residue can be treated to impart a C. D. to its components so that the residue can be further classified hydraulically with recovery of substantially free fiber along with the finer particles of gangue, usually sand and magnetite. This process of classification, recovery of the free fiber fraction, and re-treatment of the resulting heavy product can be repeated several times to achieve optimum recovery of free fiber.

Preferably, the applicant employs hydraulic hindered settling classification, for example, in a "Concenco" hydraulic hindered settling classifier to treat either of the fractions coming from the sizing step thus to separate relatively large pieces of rock and adherent fiber from the substantially free fiber. The overflow product containing the substantially free fiber is then preferably subjected to shaken bed classification, for example on a shaking table, as for instance a "Deister Plat-O" type. The spigot product is preferably treated in a jumbo machine to alter its classification differential. The jumboed material may then be reclassified and the fiber and fine gangue subjected to shaken bed classification.

Treatment of tailings

Mill tailings resulting from the dry process of asbestos recovery and weathered dump tailings present a somewhat different problem from that of treating pit ore. The rock in the tailings has already been reduced by numerous crushings to a relatively small size of about ½ inch and lower and most of the fiber has been taken out that, at the time it was dry milled, it was considered economical and practical to remove by dry milling. The tailings contain asbestos fiber in amount from about 1 to about 8%, much of which is, at least in the case of weathered dump tailings, stuck to the rock by the adhesive action so characteristic of asbestos.

There has up to now been no practical and economical way devised of effecting substantially complete recovery of fiber from either mill or dump tailings and so these materials have been discarded and form the mountainous dump piles that surround the typical mine. Separating the asbestos from these tailings is a phase of the invention.

When treating tailings, the tailings aggregate is sized, preferably as in the case of the ore, as described above, to remove oversize ore and oversize foreign material. Preferably substantially the maximum amount removable by screening is taken out while the loss of fiber in the oversize is reduced substantially to a minimum. The large size material, preferably substantially all over about 4 mesh and better still substantially all over 6 mesh, is removed, by choice in the presence of water. The oversize usually makes up about 40 to about 60% by dry weight of the starting mass. The per cent fiber in the undersize is generally from about 1.66 to about 20%. The loss of fiber in the screening step is usually less than ½ of one per cent, often as low as ¼ of one per cent. The fiber is fluffed non-adherent and sandy. In the case of mill tailings, the screening may be dry or wet. The undersize material is then subjected to hydraulic classification as above described in connection with the treatment of ore direct from the pit. The applicant has discovered that a C. D. is inherent in sized residues of mill and dump tailings, in that the fiber has been fluffed by the numerous crushing operations in the dry process of recovery. So, the residues can be directly subjected to hydraulic classification. The applicant prefers, as in the case of the ore from the pit, to employ hydraulic hindered settling classification, for example in a "Concenco" classifier, and then to pass the overflow product to a shaking table, for example a "Deister Plat-O."

The treatment of dry mill tailings direct from the dry milling operation is effected in substantially the same manner as for weathered dump tailings with the exception that water may not be needed in the screening step. The weathered dump tailings usually require water to break the adhesion between the fiber and the rock which has been set up over the long period of time in which the tailings have been in the dump.

Detailed description

The principles of separation for any type of asbestos-containing ore according to the present invention, are similar although the specific conditions of treatment differ. The nature of the invention and how it can best be carried out is dealth with more specifically in the following description illustrated by the accompanying drawings which show preferred arrangements of apparatus for carrying it out and in which.

Treatment of weathered dump tailings

Figure 1:
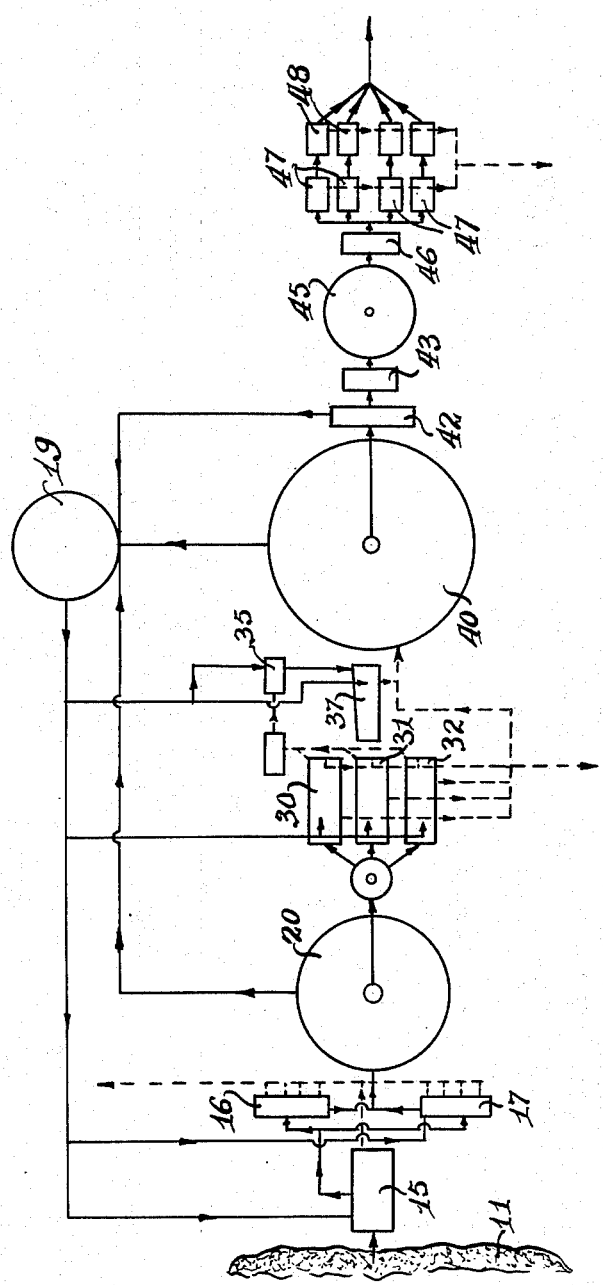
Figure 1 is a schematic diagram or flow sheet indicating an arrangement of the equipment which is preferred for the treatment of weathered dump tailings.
Figure 2:
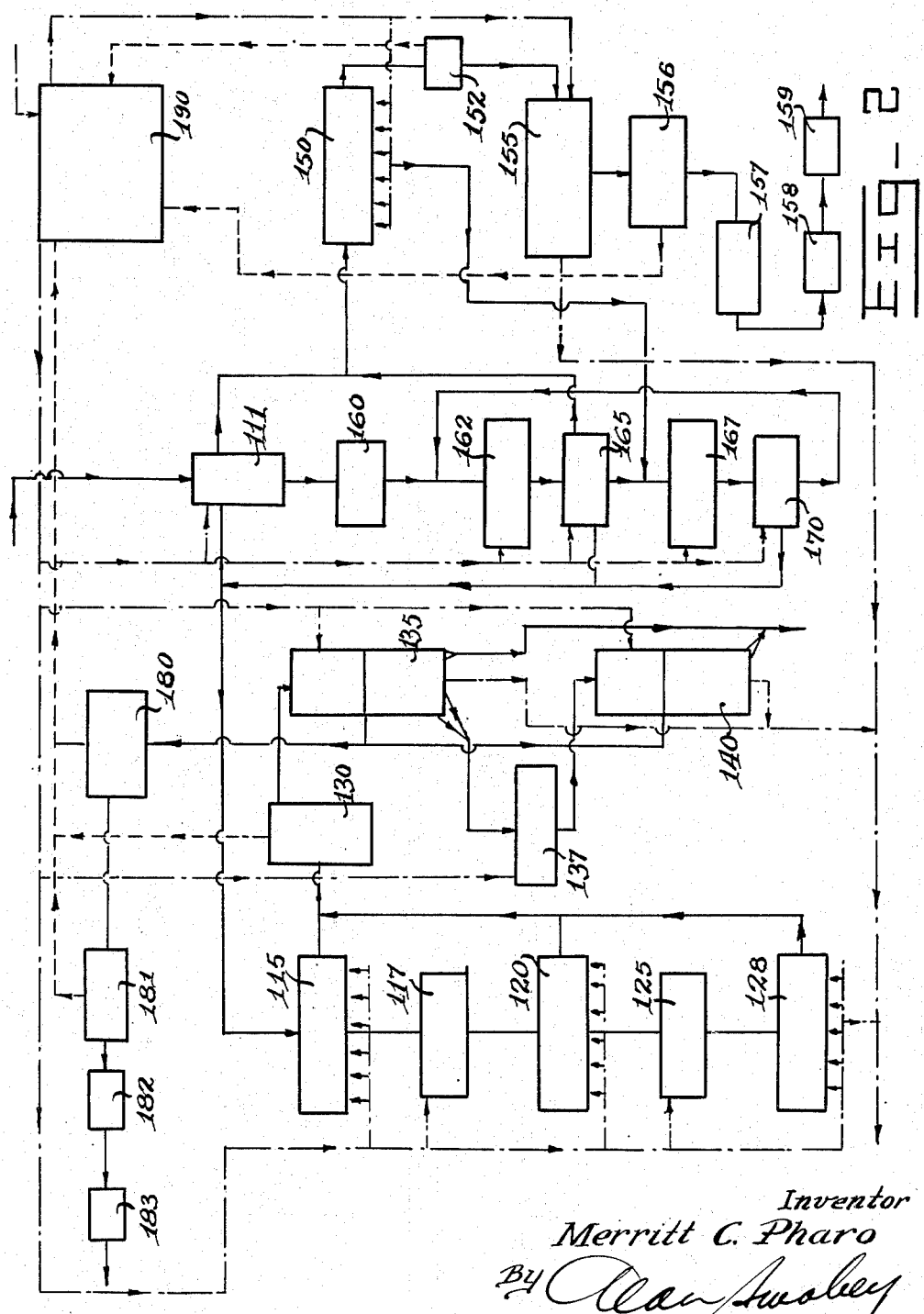
Figure 2 is a schematic diagram or flow sheet showing an arrangement of equipment preferred for treating pit ore.

Referring now to Figure 1 of the drawings, 11 represents a sand dump, i. e., a dump containing weathered dump tailings typical of those found at Thetford Mines, Quebec, Canada, and other asbestos mining centers. In this dump the tailings are made of rock, generally reduced to about ½ inch and lower and containing residual asbestos fiber, which is discarded from the conventional dry method of recovering asbestos from its ore. Canadian asbestos mines are surrounded by mountainous dump piles of this discarded material. In one mining center alone there is estimated to be about six million tons of dump tailings. These tailings are believed to contain anywhere from 1 to 8% of short asbestos fiber and so far no practical way has been devised for separating it from the rock. About 95% of the tailings aggregate is thought to be serpentine rock. The individual fibers are stuck to this rock and are extremely difficult to remove. About 60 to about 75% of the fiber is in the fluffed state. Although this fiber is free from the rock, it has a tendency not only to adhere to the rock, but also the individual fibers adhere together in small bundles which are particularly difficult to separate unless mixed with water.

The fiber content of a characteristic batch of dump tailings measured by the Quebec Standard Test, is as follows:

Minimum: 0.0—0.0—5.0—11.0
Maximum: 0.0—0.0—10.0—6.0

Recovery of fiber

SIZING

In accordance with a preferred aspect of the present invention the dump tailings aggregate from the dump 11 is sized, preferably by the use of a scalping screen 15 so as to remove substantially the maximum amount of oversize material which can be removed while reducing the loss of fiber in the oversize substantially to a minimum. With weather dump tailings of the type described, the applicant has found that he can remove substantially all material over about 4 mesh, preferably over about 6 mesh, this being effected by screening through a scalping screen of these sizes. Water from tank 19 is sprayed by sprays (not shown) on the material during screening so as to effect separation of the fiber adhering to the rock and to prevent the adhesion retaining the fiber in the oversize. The applicant also prefers to mix the material, prior to passing it onto the screen, with water. This has been found to make the screening more efficient in that the material is in the form of a slurry. In this way the loss of fiber in the oversize may be reduced substantially to a minimum generally to less than about ¼ of 1% of the total amount of fiber in the tailings aggregate and not more than about ½ of 1%. The undersize material containing the majority of the asbestos fiber is recovered and the oversize material discarded.

The screens preferably employed are Symons screens, well-known in the asbestos industry and described in Taggart referred to below and in the Nordberg Mfg. Co., Milwaukee, Wisconsin, U. S. A., Bulletin No. 105, entitled Operating Instructions and Repair Parts List for "Symons" Screens. Here there is a difference in the applicant's use of the screens in that water is employed during the screening operation for the purposes described.

Classification

Figure 4:
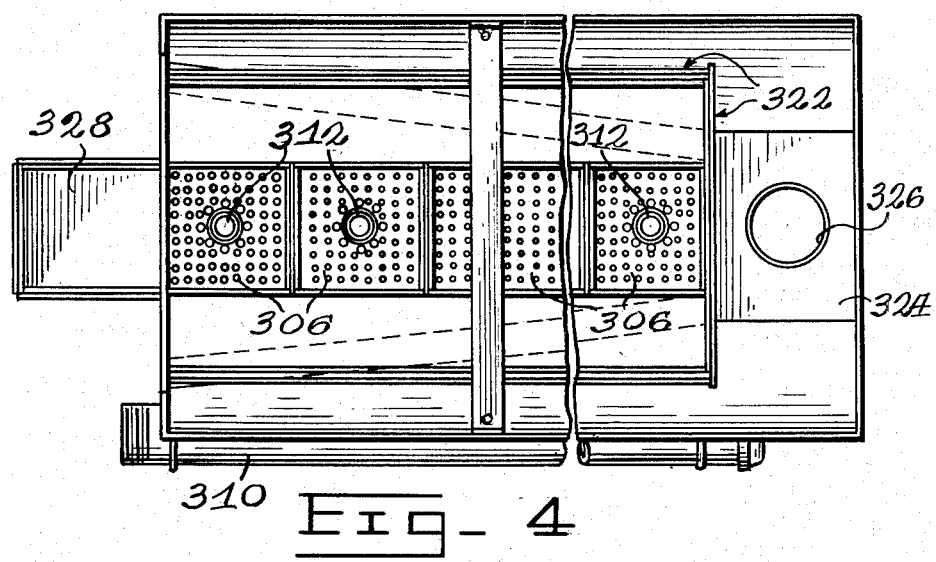
Figure 4 is a top plan view of a concentric plate type hindered settling classifier of a preferred type for performing the hydraulic classification step.
Figure 5:
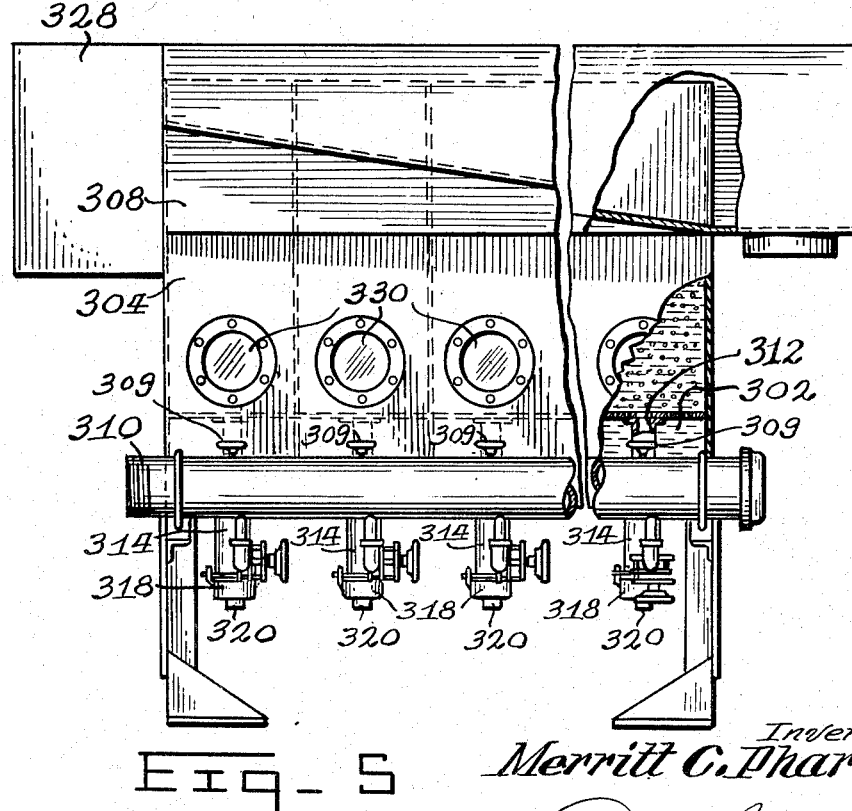
Figure 5 is a side elevation partly in section of the classifier shown in Figure 4.

The undersize material is then subjected to hydraulic hindered settling classification, preferably by the use of a concentric plate type hydraulic hindered settling classifier, two of which are shown as 16 and 17. One of these preferred classifiers is illustrated in Figures 4 and 5. This classifier consists of any number of cells from 2 to 14 as the problem requires. Each cell is square in horizontal cross section and is made of three chambers; the pressure chamber 302 at the bottom; the sorting column or chamber 304 immediately above and separated from the pressure chamber 302 by a constriction plate 306 (a plate with holes bored in it); and the launder section 308 above the sorting chamber.

The large number of small holes in the constriction plate 306 assures an even and uniform velocity of water in the sorting column 304. An adjustable clamp 309 on the hose sections of the water inlet pipes 310 controls the amount of water entering each cell with greater accuracy and sensitiveness than is possible with ordinary pipe valves.

Through the center of the constriction plate 306, opening at its upper end into the sorting chamber 304 and passing through the pressure chamber 302 but sealed therefrom, is a short section of pipe more properly termed the spigot pipe 312. Mounted onto its lower end, is a "vortex fitting" 314 which acts as a reclassifier of the product passing down from the sorting chamber above the constriction plate.

The "vortex fitting" 314 connects to the water header pipe 310. An adjustable clamp on the hose section permits accurate control of hydraulic water admitted to the "vortex fitting" 314 and spigot pipe 312. At the lower end of the "vortex fitting" 314 is the spigot bushing holder 318 into which is placed a cylindrical porcelain orifice bushing 320. The diameter of this orifice bushing 320 is selected according to the size of material and the rate at which such material is to discharge from the cell. While these small orifices are eventually abraded by the cutting action of the sand, they can be replaced in a matter of seconds and cost only a few cents apiece. In case of a choke up, a slight twist detaches the bushing holder 318 from the barrel of the "vortex fitting" 314 so that it can be dumped and replaced rapidly without loss of bed in the classifier cell.

The launder section 308 flares out above the sorting chambers so that water currents rising from each sorting chamber decrease in velocity and carrying power in accordance with the increasing cross-sectional area. The launder section 308 along the top of its two sides and end is equipped with adjustable overflow weirs 322 which can be raised or lowered to control distribution of discharge of slime overflow water. Water overflowing the weirs 322 of the launder section 308 is caught in the slime overflow compartment 324 which surrounds the launder section, and is then carried off by a 6" (or smaller) discharge pipe 326.

The feed compartment 328 at the opposite end of the classifier opens by means of a rectangular hold in the end plate of the classifier, into the launder section 308, permitting material to enter the classifier proper near the top of the sorting column 304 of the first cell.

Operation

The feed, in a high ratio of solids to water, is sluiced or pumped to the feed compartment of the classifier from whence it drops into the first cell.

The amount of water permitted into the pressure chamber 302 of each cell controls the velocity of the water rising in the sorting chamber 304 since the only outlet is upward through the constriction plate 306. Only the coarsest and heaviest particles will be able to sink against the ascending current of water in the sorting chamber 304. The fines will be carried upward into the launder section 308 and start flowing toward the slime overflow 324. But the velocity of the upward current of water of each sorting chamber 304 begins to diminish immediately upon reaching the launder section 308 which flares out, greatly increasing its cross section area as the water current progresses upward. As the velocity of the upward current of water drops, the carrying capacity drops correspondingly and the fines start to settle into the second cell.

The ascending current in the second cell is adjusted to permit only the coarsest and heaviest particles remaining, to settle, and the fines are carried over to the third cell. As the feed progresses toward the far end of the classifier, the velocity of water in each succeeding cell is reduced to permit finer and finer particles of the material to settle to the bottom of the sorting chamber 304 where they are drawn off through the spigot pipes 312.

Particles falling against the rising current of any sorting column 304 cannot fall further than the constriction plate 306 except as they are drawn off through the spigot pipe 312. They remain, therefore, in a mass above the constriction plate 306. Under proper adjustments of hydraulic water in the sorting column 304 and rate of discharge through the spigot pipe 312, the mass of particles above the constriction plate 306 will "teeter" as the solids in a quicksand. Setting particles are hindered by collision with particles in teeter thus crowding out undesirable light fine gangue particles.

The rate of discharge from any cell is controlled by two factors, the amount of hydraulic water admitted to the spigot pipe 312 through the "vortex fitting" 314 and the diameter of orifice bushing 320 used in the bushing holder 318. The hydraulic water added through the "vortex fitting" 314 makes the spigot pipe 312 a second sorting column capable by proper adjustment of eliminating any undesirable fines not eliminated by the sorting column 304 of the cell proper.

The glass window 330 in each cell permits the operator to see the classification taking place and to regulate the hydraulic water in each cell to produce the desired "teeter" and sorting.

The heights of the overflow weirs 322 of the launder section 308 should be adjusted to give uniform overflow of "top water" carrying away the slimes. Weirs may be adjusted to a level plane, or more commonly they can be raised at the feed end so that quantity of overflow increases uniformly toward the slime end of the classifier.

In general, the capacity of the classifier on the average sand may be figured at 2 tons of feed per hour per cell. Physical characteristics and the relative amounts of coarse and fine particles in the feed have a bearing on capacity. Water consumption varies widely but an average is 1000 gallons per ton of feed. This refers to water added at the pressure chambers 302 and is exclusive of water used in sluicing or pumping the feed to the classifier.

In the classification step, substantially all the oversize material that can be removed, while reducing the loss of fiber with the oversize material substantially to a minimum, is preferably removed as the spigot product and the overflow product containing the fiber is recovered. In this preferred process, dealing with the weathered dump tailings, the applicant has found that it is feasible to remove most of the material measuring over about 8 mesh and some of the material measuring between 6 and 8 mesh as the spigot product. This represents approximately 40 to 60% of the material resulting from the screening step. About 90 to 100% of this material in the overflow product will be through 8 mesh. The loss of asbestos fiber in the spigot product might run to one-half of one per cent and should not be more than one per cent. If more than 1% is being retained in the spigot product it is re-crushed and re-treated by hydraulic hindered settling classification to recover the amount of fiber going out in the spigot product.

The resulting overflow product contains sand or rock residue, and mineral (usually magnetite). The proportion of the material entering the classification step which is recovered will vary depending on the particular type of residue being treated. About 2.7 to about 50% will be fiber, depending on the particular nature of the starting material from the dump.

Where rake classification is employed for tailings it is estimated that from about 8 to about 25% of the starting mass will be recovered as asbestos-containing residue which goes on to the next step, tabling. Substantially all this material will be through 6 mesh, preferably nearly all e. g. about 90% to 100% through 8 mesh. About 5 to about 60% will be fiber. Only about ¾ to about 1% of the fiber will be lost in the classification. If the fiber lost exceeds this amount, the gangue can be recycled through the classification step and further recovery effected. The fiber will be fluffed non-adherent but sandy and the mass will be in the form of a classified slurry.

*Classification—shaken bed—thickener*

The overflow product is then subjected to shaken bed classification, preferably on shaking tables 30—31—32, desirably coal washing tables, several of which are generally used in parallel, as indicated at 30, 31 and 32.

Figure 3:
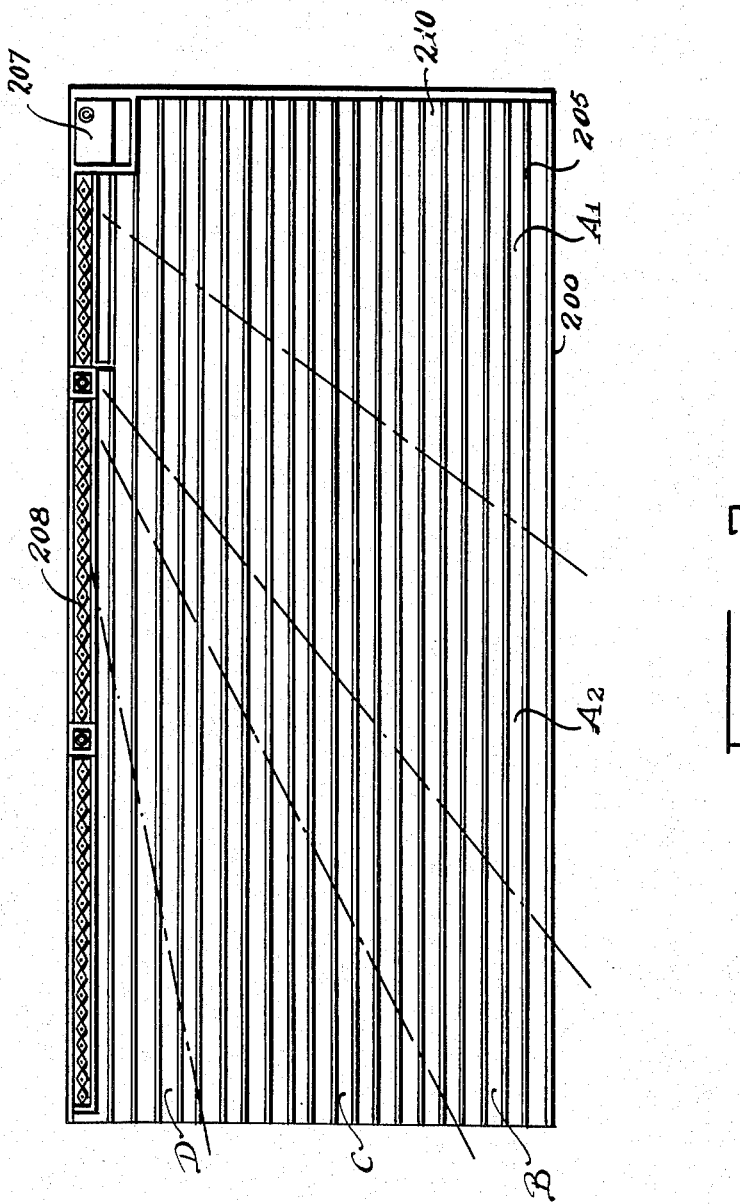
Figure 3 is a top plan view of a shaking table of a type preferred for performing the tabling step and on which are illustrated by dividing zones the various separations which ensue when treating asbestos in accordance with the invention.

One suitable type of shaking table is shown in Figure 3. This table is a "Deister Plat-O" coal washing table described in "Bulletin 30" of the Deister Machine Company. It includes a deck 205 which slopes upward from the feed or head motion end to the discharge end. For example, in a table 16 feet long, the feed end is about ½ inch lower. The table is also inclined slightly at right angles to the line of reciprocation. For example, a table 7½ feet wide is usually about 1½ inches lower at the discharge side. The inclination is adjustable.

A primary washer feed box 207 and dressing water board 208 are placed along the high side of the deck.

The deck is supported on an under-structure which rests on piers preferably of concrete. These piers are designed to give stability. The under-structure and bearings are not shown in the drawings and the table is reciprocated by a head motion (not shown). All these features are well known in the art. A range of reciprocation of from 50 to 150 strokes of ½ to 1½ inches per minute are effective for the invention. The longer stroke is preferred.

The deck proper is constructed of specially selected wood, usually cypress. The surface of the deck is generally covered with linoleum. The deck is provided with riffles 210 usually of hard wood which, at the drive end, are usually from 1½ to 2 inches in height, tapering to nothing at the tailings end.

The asbestos residue with the addition of sufficient water permits stratification and concentration of the sand as soon as it reaches the surface of the deck. The longitudinal riffles 210 catch the stratified sand and guide it towards the refuse discharge end of the deck under the force of the differential action of the head motion and the frictional contact of the particles with the deck covering. Due to the transverse inclination of the deck the water coming with the asbestos residue together with that supplied by the dressing water boards carries the asbestos concentrates over the riffles across the deck and off the concentrate side. In Figure 3, chain lines indicate roughly the separation that ensues.

On the head motion end of the table there is a zone "A1" in which there are concentrates of relatively fluffy fiber. In the zone "A2" there are concentrates of harsher fiber. Sand starts to occur at the border line between zone "A2" and zone "B" so that in zone "B" there is crudy fiber and sand. Then, towards the termination of zone "B" the asbestos ends and almost entirely sand is found in zone "C" in the case where tailings residues are being treated and sand and veinlets of asbestos where pit ore residue is being treated. Zone "D" contains magnetite.

A separation is thus made between (a) fluffy fiber, (b) crudy fiber, (c) sand, and (d) magnetite. One should also note that the concentrates, referring to asbestos, correspond to the tailings when referring to other minerals and vice versa. So the concentrates leave the portion of the table where tailings of other minerals leave. About 3 to about 20% of the starting mass will be recovered as asbestos fiber. Only from about .25 to about .50% of the fiber will be lost in the tabling operation.

After primary tabling, it may be found that there is a certain amount of sand remaining in the concentrates. Sometimes this runs to about 15%. This can be removed, if desired, by a further tabling step. By present dry methods, it is usually considered difficult to separate 16 mesh material, impractical to remove 22 mesh material and virtually impossible to remove 35 mesh material, from fiber of the same mesh. By tabling in accordance with the invention, low mesh sand, for example 35 mesh, can be separated from low mesh fiber, as well as high mesh sand from high mesh fiber.

In connection with tabling, it should also be explained that larger material can be handled than specified above. But, this would require a larger number of tables. So, the applicant prefers to subject heavy material to other forms of hydraulic classification before bringing it to the tabling step.

In the case of pit ore, the middlings will cover a wider section of the table than in the case of tailings.

Desirably, the overflow product from the classifier is de-watered or thickened, preferably on a thickener 20 (suitably either a "Dorr" or "Hardinge" apparatus) prior to being passed to the table, water being flowed onto the table to effect tabling action.

The middlings may be re-treated after tabling by passing them through a fluffing machine like the jumbo 35 in the presence of water, and then to another shaking table 37. The jumbo serves to fluff the fiber and thus give it a C. D.

*Recovery*

The asbeston fiber so recovered is then treated, preferably as follows. The material is thickened, for example by passing it through a thickener 40, settling cones or a de-watering screen. The de-watered product is made into a cake, preferably by passing it through a filter 42. The cake is broken up into pieces by shredding on a shredder 43. The shredded cake is dried in a dryer 45, preferably so that the discharge product is not at a temperature greater than about 300° C. The dried product is then fluffed on a fluffer 46 and graded on a grader or number of graders 47. If desired the dried product can be further screened on screens 48 to remove what has not been taken out by tabling. The product is then bagged and shipped.

The dryer preferably employed is the "Nichols Herreshoff" incinerator described, for example, at page 8 of the booklet entitled The Nichols Herreshoff Incinerator published as Bulletin No. 210, by the Nichols Engineering and Research Corporation, New York, N. Y.

In the screening and classification steps, especially in the latter, the discharge product may not measure exactly to a given screen size. (For example, there might be a small amount of a material over the size or under in size range.) There may be a slight variation in the size of screen measurement given.

All mesh measurements mentioned in this application are made on a wire cloth screen.

*Treatment of pit ore*

One example of the treatment of pit ore is as follows. Asbestos ore from the mine feed of a large mine at Thetford Mines, Quebec, containing lumps of ore from about 16 inches down, as resulting from blasting in the pit, was the material treated. The material was fed to a jaw crusher (not shown). The ore was crushed so as to result in lumps ranging from roughly 4 inches downwards. Thus, after the secondary crushing, and prior to the first screening step, the ore may range from 4 inches to 100 mesh in size, with from 1 to 20% fiber content of which 20 to 40 per cent may be in a free or fluffed condition. The crushed material was passed to a two deck Symons scalping screen 111, in which the upper deck had a one inch mesh screen and the lower deck a ¼ inch screen. The crushed material was thus divided into three fractions, namely (a) the oversize, i. e. above about one inch material, (b) the intermediate material, i. e. from about one inch down to about ¼ inch and (c) the undersize material, i. e., below about ¼ inch.

The oversize material is a mass of ore containing large lumps in which fiber is bonded in form of veins and associated with a small quantity of free fiber (perhaps about 2 to about 5 per cent by weight) in a partially fluffed state. 90 to 95% is serpentine. The size of the ore ranges say about 4 inches in diameter down to say about 1 inch, some as low as 100 mesh. There is about 1 to about 20% fiber in the mass. There is bonded fiber veins in the rock and very "crudy" and dirty free fiber. The intermediate and undersize material represents a "crudy" mass of free fiber and fiber veins in serpentine rock. The intermediate material was through 1 on ¼ inch. The undersize was through ¼ inch. About 1 to 15% of the total fiber content is long fiber and the remainder short fiber. The long fiber is defined as that remaining on ¼ inch mesh and the short fiber is that passing through ¼ inch mesh screen. There is approximately 1 to 30% total fiber in the mass of intermediate and undersize products.

The oversize, intermediate, and undersize materials were treated as follows.

*Treatment of undersize*

The undersize material was passed to a "Concenco" hydraulic classifier 115. The classification resulted in an overflow product of substantially free fiber and sand and a spigot product made up of sand from ¼ inch down to about 10 mesh. The overflow product was further processed as will be described. The spigot product was then treated in a jumbo hammer mill 117 with added water.

The jumbo mill preferably employed is a well-known piece of equipment for treating asbestos. It is usually a horizontal cylinder about 6 to about 8 feet long and about 30 inches in diameter, through which runs a horizontal shaft with arms having beveled tips. The feed is introduced at the top at one end and is agitated and the fiber fluffed and the rock broken up as it is moved toward the bottom discharge portion at the other end by the action of the arms. The use of this apparatus, according to the invention, is however somewhat unusual in that water is employed. The speed of the jumbo apparatus is usually, in accordance with the invention, between about 500 to about 700 R. P. M. preferably about 600 R. P. M.

This had the effect of fluffing the veins and veinlets of fiber present so as to condition it for further classification of the masses containing it. The product coming from the jumbo 117, made up of fiber which had been fluffed, some spicules of unfluffed fiber, and rock which had been further broken up was passed to another "Concenco" hydraulic classifier 120. The overflow product, essentially the same as that from the first classifier was drawn off and treated as will be described. The spigot product was treated in a jumbo hammer mill 125, de-watered (not shown) and then subjected again to "Concenco" classification in a classifier 128. The spigot product from this last classification was discarded. The combined overflow product contains about 5 to 50% fiber of dry weight.

The overflow product was combined with that from the first two classifications and treated as follows. The combined overflow product was thickened in a cone thickener 130 (or optionally a "Dorr" thickener may be employed). This thickened product was fed to three shaking tables 135 ("Deister Plat-O"). Water was added to the tables to effect separation. This caused the material to separate as described in conjunction with Figure 3 into (1) a concentrate of fluffed asbestos fiber, (2) middlings made up of harsh fiber and sand (3) tailings made up of sand and (4) tailings made up of magnetite. The magnetite tailings were treated as will be described. The sand tailings were discarded. The concentrates were treated as will be described. The middlings containing fiber were passed to a jumbo machine 137 where they were treated to fluff the fiber lumps. The product from the jumbo machine was passed to a shaking table 140 of the type described. On this table the product was separated, by the addition of water, into tailings containing fine sand and magnetite (which were treated to recover the magnetite), middlings containing sand and an inconsequential amount of fiber, which was discarded, and concentrates containing asbestos fiber. The concentrates from the first three tables and from the second table respectively were combined and treated as will be described.

*Treatment of intermediate material*

The product from the intermediate deck of the Symons screen, containing substantially all long fiber ranging from ¼ inch in length and upwards was passed to a jumbo machine (not shown) and then to a "Concenco" classifier 150, with added water so as to produce classification. The overflow product was de-watered on a de-watering screen 152, and then passed to a shaking table 155 of the "Deister Plat-O" type, thus separating the material into free fiber as the concentrates and sand and some fiber spicules as the middlings and tailings. The slurry of fiber from the table was then thickened, in a thickener 156, a filter 157, a shredder 158, and drier 159 so that the long fiber was recovered as a spinning grade fiber. The spigot product from the classifier was treated as will be described.

*Treatment of oversize product*

The oversize material, i. e., over one inch, having passed over the Symons screen 111 was crushed in a cone crusher 160 down to about one inch. Thence the material was passed to a jumbo machine 162 to crush it down to about ⅝ inch and at the same time to fluff the lumps of fiber. From the jumbo the material was sized on a Symons two deck screen 165 in which the top deck had a ½ inch screen and the bottom deck a ¼ inch screen. The long fiber retained on the ¼ inch deck was passed to the long fiber classifier 150 where it was treated as described above in connection with the treatment of the intermediate product. The minus ¼ inch material from the screen 165 returns to the classifier 115. The material remaining on the top deck was passed along with water to a jumbo 167 with the spigot product from the long fiber primary classifier 150. This material was thus treated to fluff the asbestos lumps and further divide the rock. Thence the material was passed to a ¼ inch Symons single deck screen 170. This screen separated out the minus ¼ inch product which was cycled into the undersize fiber classification cycle with the undersize from the primary two deck screen. The oversize material from the last mentioned single deck Symons screen was returned to the first jumbo 162 in the oversize treatment cycle and retreated.

The material from the tables 135 to 140 is passed to a thickener 180, then to a filter 181 and from the filter to a shredder 182 then to a drier 183.

Water is re-circulated to the various pieces of apparatus from and to the tang 190 through communications indicated by dotted lines. Suitable pumps (not shown) are provided to convey the slurries.

In the long and short fiber cycles, a typical run of fiber has approximately the following measurements according to the Quebec Standard Test:

Long fiber—
    Maximum: 4.0—7.0—4.0—1.0
    Minimum: 0.0—8.0—6.0—2.0
Short fiber—
    Maximum: 0.0—8.0—6.0—2.0
    Minimum: 0.0—0.0—0.0—16

*Advantages*

There are a number of advantages to the present invention among which are the following:

1. The drying of large masses of extraneous material is avoided thus eliminating a major item of cost.
2. Recovery of low grade and previously discarded fiber is made possible.
3. A comparatively dust free product is possible as compared with the dust laden products resulting from dry methods of recovery.

4. Substantially iron free fiber.

Other advantages will be apparent to those skilled in the art.

References

The following references give further details of prior art methods of recovering asbestos fiber.

James Gordon Ross—"Chrysotile Asbestos in Canada"—Canadian Department of Mines.

Previous attempts to employ hydraulic processes of asbestos fiber recovery are discussed in the following Canadian patents to Dolbear:

| Patent No. | Date | Inventor |
| --- | --- | --- |
| 216,508 | Mar. 7, 1922 | Dolbear. |
| 233,367 | Aug. 7, 1923 | McKay et al. |
| 245,617 | Dec. 23, 1924 | Dolbear et al. |
| 245,618 | do | Dolbear. |
| 249,621 | May 12, 1925 | Do. |
| 250,779 | June 16, 1925 | Do. |
| 273,227 | Aug. 16, 1927 | Do. |
| 279,661 | Apr. 24, 1928 | Dolbear et al. |
| 280,031 | May 8, 1928 | Dolbear. |
| 291,626 | July 23, 1929 | Do. |
| 294,343 | Oct. 29, 1929 | Do. |

The following is literature describing specific apparatus of the nature employable in certain of the steps of the invention.

"Deister Plat-O Coal Washing Tables"—Bulletin No. 30 Deister Machine Company.

"Description of the Concenco Model SV Constriction Plate Classifier and its Operation"—The Deister Concentrator Company, June 4, 1943.

Taggart—"Handbook of Mineral Dressing"—second printing, March 1947—Wiley.

"The Nichols Herreshoff Incinerator"—Bulletin No. 210, Nichols Engineering and Research Corporation.

"Operating Instructions and Repair Parts List for 'Symons' Screens," Bulletin No. 105, Nordberg Mfg. Co.

I claim:

A process of recovering asbestos fiber, which comprises recovering, from an asbestos dump, weathered tailings containing from about 1 to about 8% of short chrysotile asbestos fiber in which from about 60 to about 75% of which is in the fluffed state, the remainder being about 95% rock and predominantly of a size of ½ inch or smaller in which the asbestos fiber is generally adherent to the rock and the fibers are generally adherent together in small bundles, screening the tailings to remove substantially all the material over about 4 mesh constituting from about 40 to about 60% of the starting mass while retaining the loss of fiber at less than about ½% so as to obtain a dressed undersize material containing up to about 20% fiber, subjecting the undersize material thus obtained to hydraulic hindered settling classification to remove at least 90% of the material over about 8 mesh representing approximately 40 to 60% of the starting undersize material while retaining the loss of asbestos fiber to not more than about 1%, thereby to obtain an overflow product in which 90 to 100% is through 8 mesh and containing up to about 50% asbestos fiber, forming from the overflow product an aqueous slurry containing from about 1 to about 15% solids, subjecting this slurry to hydraulic shaken bed classification thereby to remove from 3 to about 20% of the solids in the aqueous mass as asbestos fiber while holding the loss of fiber to not more than about .25% to .50% by weight.

References Cited in the file of this patent

UNITED STATES PATENTS

| Number | Name | Date |
| --- | --- | --- |
| 1,310,939 | Bancroft | July 22, 1919 |
| 1,632,620 | Nanfeldt | June 14, 1927 |
| 1,684,365 | Dolbear | Apr. 21, 1928 |
| 1,741,869 | Mett | Dec. 31, 1929 |
| 2,289,527 | Tartaron et al. | July 14, 1942 |

OTHER REFERENCES

Engineering, and Mining Journal-Press, vol. 119, Apr. 11, 1925, pages 607–8. (Copy in Scientific Library.)